(12) United States Patent
Masuda et al.

(10) Patent No.: US 8,356,570 B2
(45) Date of Patent: Jan. 22, 2013

(54) INDICATOR APPARATUS

(75) Inventors: Hideki Masuda, Niigata (JP); Tatsuki Kawamura, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 397 days.

(21) Appl. No.: 12/594,776

(22) PCT Filed: Apr. 1, 2008

(86) PCT No.: PCT/JP2008/056455
§ 371 (c)(1),
(2), (4) Date: Oct. 5, 2009

(87) PCT Pub. No.: WO2008/126721
PCT Pub. Date: Oct. 23, 2008

(65) Prior Publication Data
US 2010/0043697 A1    Feb. 25, 2010

(30) Foreign Application Priority Data
Apr. 11, 2007 (JP) .............................. 2007-103967

(51) Int. Cl.
*G01D 7/00* (2006.01)
(52) U.S. Cl. ... 116/288; 116/62.1; 116/204; 116/DIG. 6
(58) Field of Classification Search .................. 116/286, 116/288, 284, 290, 292, 294, DIG. 6, DIG. 32, 116/62.1, 204, 287, 303, 62.4
See application file for complete search history.

(56) References Cited

U.S. PATENT DOCUMENTS

| | | | | |
|---|---|---|---|---|
| 2,371,511 A | * | 3/1945 | Faus | 116/284 |
| 2,926,306 A | * | 2/1960 | Stegner | 324/154 R |
| 3,776,176 A | * | 12/1973 | Doyle | 116/288 |
| 4,016,827 A | * | 4/1977 | Lawrence, Jr. | 116/204 |
| 4,090,131 A | * | 5/1978 | Mas | 324/146 |
| 4,195,518 A | * | 4/1980 | Fees | 73/861.57 |
| 4,878,453 A | * | 11/1989 | Inoue et al. | 116/288 |

(Continued)

FOREIGN PATENT DOCUMENTS
JP    51-76447    6/1976
(Continued)

*Primary Examiner* — R. A. Smith
*Assistant Examiner* — Tania Courson
(74) *Attorney, Agent, or Firm* — McDermott Will & Emery LLP

(57) ABSTRACT

To provide an indicator apparatus in which a pointer is secured to a pointer drive means by attraction force of magnets and the pointer can be secured more tightly to prevent an overshoot and pulsation of the pointer. The indicator apparatus has a display plate 21, a pointer 22 provided on a front-face side of the display plate 21, a pointer drive means provided on a back-face side of the display plate 21 for rotating the pointer 22, a first magnet 22c in a ring shape provided for the pointer 22, and a second magnet 25a provided for the pointer drive means to be opposite to the first magnet 22c, in which the pointer 22 is rotated in association with rotation drive of the pointer drive means by attraction force of the first and second magnets 22c, 25a. A shaft portion 23 rotatably supporting the pointer 22 is located in the display plate 21. The shaft portion 23 includes a main shaft 23a, a main-shaft receive portion 23b securing the main shaft 23a to the display plate 21, and a rotation shaft portion 23c provided rotatably about the main shaft 23a and located on and secured to the pointer 22.

4 Claims, 2 Drawing Sheets

U.S. PATENT DOCUMENTS

| | | | | |
|---|---|---|---|---|
| 4,891,987 A * | 1/1990 | Stockton et al. | | 73/732 |
| 4,973,905 A * | 11/1990 | Neidhardt | | 324/164 |
| 5,582,129 A * | 12/1996 | Furuya | | 116/284 |
| 6,216,630 B1 * | 4/2001 | Ogawa et al. | | 116/284 |
| 6,470,822 B2 * | 10/2002 | Adams et al. | | 116/284 |
| 6,538,423 B1 * | 3/2003 | Sato et al. | | 324/146 |
| 6,624,608 B2 * | 9/2003 | Komura | | 318/696 |
| 6,742,396 B2 * | 6/2004 | Schenk, Jr. | | 73/735 |
| 7,281,490 B2 * | 10/2007 | Buchanan | | 116/271 |
| 7,446,446 B2 * | 11/2008 | Kodani | | 310/103 |
| 7,810,444 B2 * | 10/2010 | Sultan et al. | | 116/288 |
| 8,151,725 B2 * | 4/2012 | Masuda et al. | | 116/286 |
| 2002/0059895 A1 * | 5/2002 | Adams et al. | | 116/288 |
| 2008/0100173 A1 * | 5/2008 | Komagata et al. | | 310/261 |
| 2010/0064961 A1 * | 3/2010 | Masuda et al. | | 116/286 |
| 2010/0127958 A1 * | 5/2010 | Masuda et al. | | 345/84 |
| 2010/0288183 A1 * | 11/2010 | Masuda | | 116/303 |
| 2010/0328091 A1 * | 12/2010 | Ogasawara et al. | | 340/815.78 |
| 2011/0100290 A1 * | 5/2011 | Nakane et al. | | 116/286 |

FOREIGN PATENT DOCUMENTS

| | | |
|---|---|---|
| JP | 3-44624 | 4/1991 |
| JP | 8-159815 | 6/1996 |
| JP | 2002-323350 | 11/2002 |
| JP | 2003-161650 | 6/2003 |

* cited by examiner

INDICATOR APPARATUS

RELATED APPLICATIONS

This application is the U.S. National Phase under 35 U.S.C. §371 of International Application No. PCT/JP2008/056455, filed on Apr. 1, 2008, which in turn claims the benefit of Japanese Application No. 2007-103967, filed on Apr. 11, 2007, the disclosures of which Applications are incorporated by reference herein.

TECHNICAL FIELD

The present invention relates to an indicator apparatus in which a pointer points at an indicating portion on a display plate.

BACKGROUND ART

There have been conventionally indicator apparatuses in which a pointer points at an indicating portion on a dial (display plate). In such an indicator apparatus, the pointer is directly secured to a rotation shaft of a pointer drive means such as a stepping motor, and the pointer is rotated in association with rotation drive of the pointer drive means and thus caused to point at the indicating portion.

Such a structure, however, requires a punching step of forming a through hole for passing through the rotation shaft in the dial that complicates the manufacture of the dial, thereby causing the problem of the inability to manufacture the dial inexpensively. Especially, when a variable display element such as a liquid crystal display element is used for the dial as disclosed in Patent Document 1, a through hole should be formed in a glass substrate of the variable display element which leads to the problem of an increase in the manufacture cost of the variable display element.

Patent Document 1: JP-UM-A-3-44624
Patent Document 2: JP-A-2003-161650

To address the problems, the present applicant has proposed an indicator apparatus described in Patent Document 2 in which a first magnet is provided for a pointer and a second magnet is provided to a pointer drive means such that the pointer is rotated in association with rotation drive of the pointer drive means by the magnetic force (attraction force) of the first and second magnets. According to the structure, the dial can be manufactured easily and inexpensively without formation of a through hole in the display plate.

DISCLOSURE OF THE INVENTION

Problems that the Invention is to Solve

Simply placing an insertion portion (shaft member) of a substantially cylindrical shape into the pointer as disclosed in Patent Document 2, however, results in an insufficient structure for securing the pointer. When the pointer is rotated to point at a predetermined indication position, an overshoot occurs in which the pointer moves too far from the indication position. In addition, pulsation of the pointer may occur when the pointer is step-operated. Thus, the indicator apparatus needs to be improved.

The present invention has been made in view of the above-mentioned problems, and it is an object thereof to provide an indicator apparatus in which a pointer is secured to a pointer drive means by attraction force of magnets and the pointer can be secured more tightly to prevent an overshoot and pulsation of the pointer.

Means for Solving the Problems

To solve the problems, the present invention is an indicator apparatus having a display plate, a pointer provided on a front-face side of the display plate, a pointer drive means provided on a back-face side of the display plate for rotating the pointer, a first magnet provided for the pointer, and a second magnet provided for the pointer drive means to be opposite to the first magnet, the pointer being rotated in association with rotation drive of the pointer drive means by attraction force of the first and second magnets, characterized in that a shaft portion rotatably supporting the pointer is located in the display plate and the shaft portion includes a main shaft, a main-shaft receive portion securing the main shaft to the display plate, and a rotation shaft portion provided rotatably about the main shaft and located on and secured to the pointer.

The present invention is characterized in that the shaft portion is made of a non-magnetic material.

The present invention is characterized in that the shaft portion includes a rotation adjusting member located between the rotation shaft portion and the main-shaft receive portion and adjusting the frictional force of the rotation shaft portion.

The present invention is characterized in that the main-shaft receive portion has a hollow portion containing a viscous liquid and the bottom end of the rotation shaft portion is located in the hollow portion.

The present invention is characterized in that the display plate has a variable display element including a variable display portion at which the pointer points.

The present invention is characterized in that the display plate has a light-transmitting substrate in which the shaft portion is located.

Advantage of the Invention

The present invention relates to an indicator apparatus in which a pointer is secured to a pointer drive means by attraction force of magnets and the pointer can be secured more tightly to prevent an overshoot and pulsation of the pointer.

Figure 1:
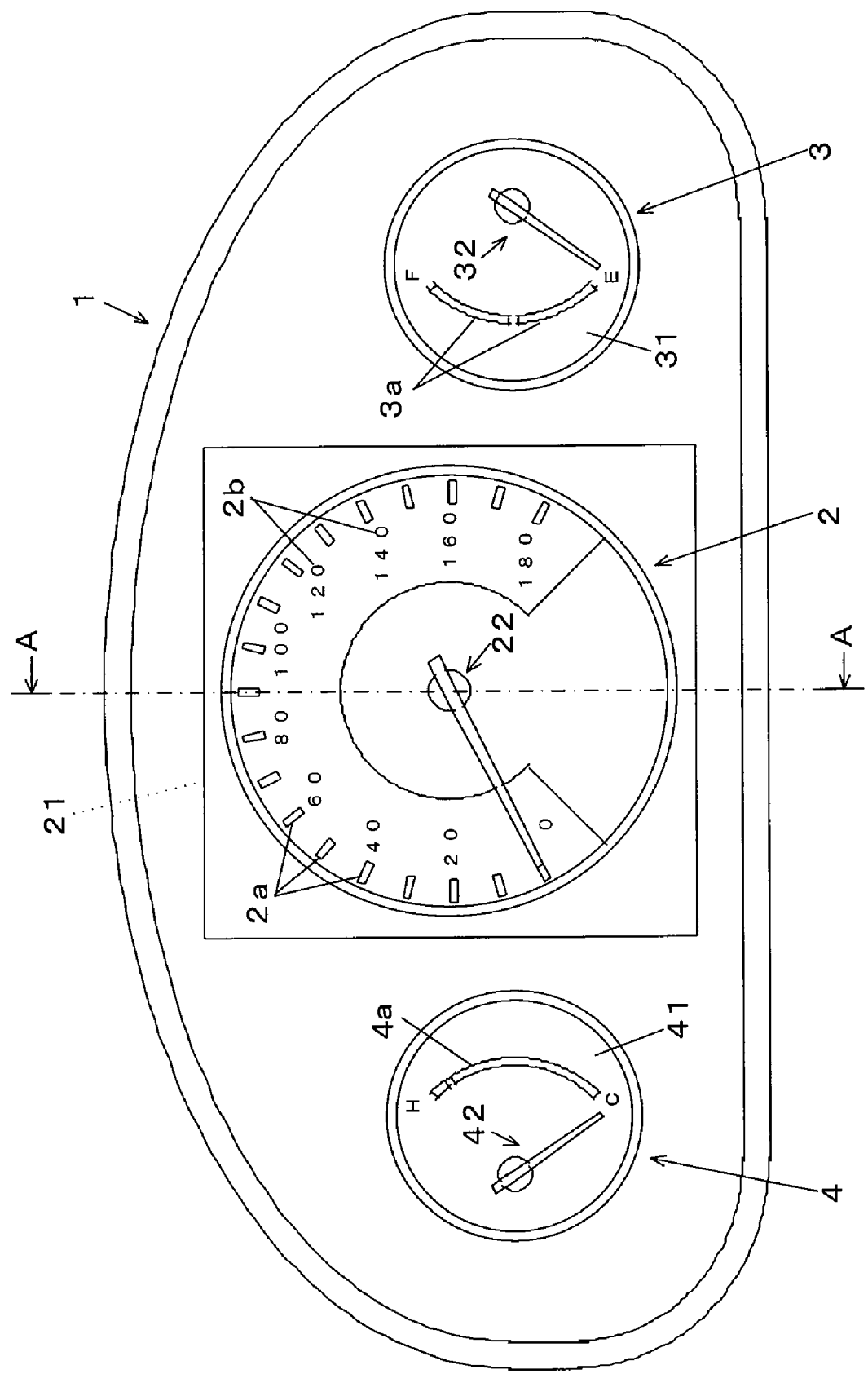
[FIG. 1] A front view showing a first embodiment of the present invention.

DESCRIPTION OF REFERENCE NUMERALS AND SIGNS 21 display plate
21a light-transmitting substrate
21b liquid crystal display element (variable display element)
22 pointer
22a pointer body
22b pointer cap
22c first magnet
22d first yoke
22e light-receive portion
22f main-shaft receive portion
23 shaft portion
23a main shaft
23b main-shaft receive portion
23c rotation shaft portion
23d washer (rotation adjusting member)
23e main-shaft receive portion 23f hollow portion
24 LED
25 bearing portion
25a second magnet
25b second yoke
26 stepping motor
27 circuit substrate

BEST MODE FOR CARRYING OUT THE INVENTION

In the following, a first embodiment in which the present invention is applied to a vehicle combination meter will be described with reference to the accompanying drawings.

In FIG. 1, reference numeral 1 shows a housing. The housing 1 has a shade member and a case body to accommodate three indicators, that is, a speed meter 2, a fuel meter 3, and a water-temperature meter 4. The speed meter 2 is larger than the fuel meter 3 and water-temperature meter 4 and is placed between the fuel meter 3 and the water-temperature meter 4. The speed meter 2 has a display plate 21 and a pointer 22. The fuel meter 3 and the water-temperature meter 4 have dials 31, 41, and pointers 32, 42, respectively. The dials 31, 41 are provided by forming light-shield portions through printing on substrates made of light-transmitting resin (for example, polycarbonate) except for indicating portions 3a, 4a, respectively. The pointers 32, 42 are rotated by a stepping motor (not shown) to point at the indicating portions 3a, 4a of the dials 31, 41, respectively.

Figure 2:
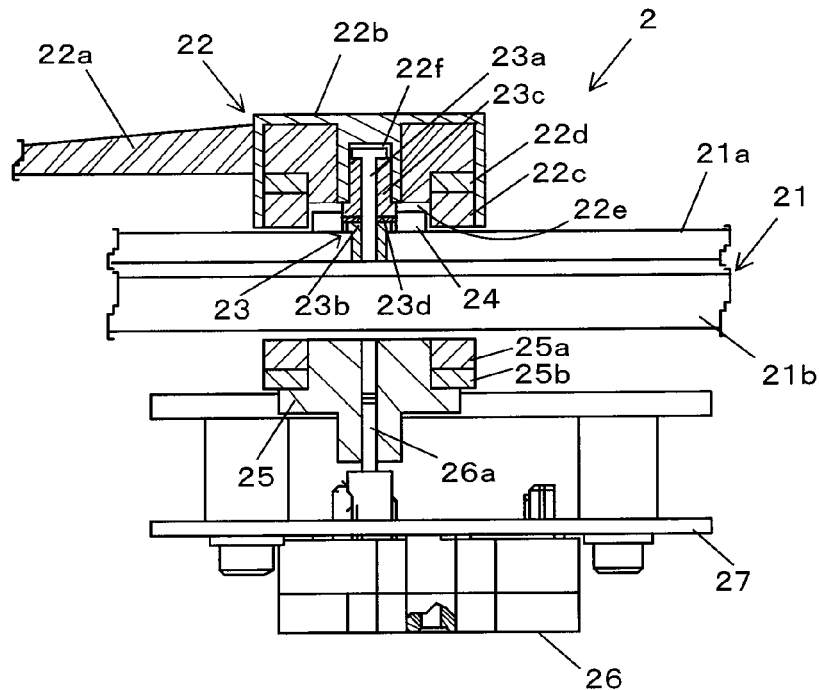
[FIG. 2] An enlarged section view of main portions to show the first embodiment of the present invention.
Figure 3:
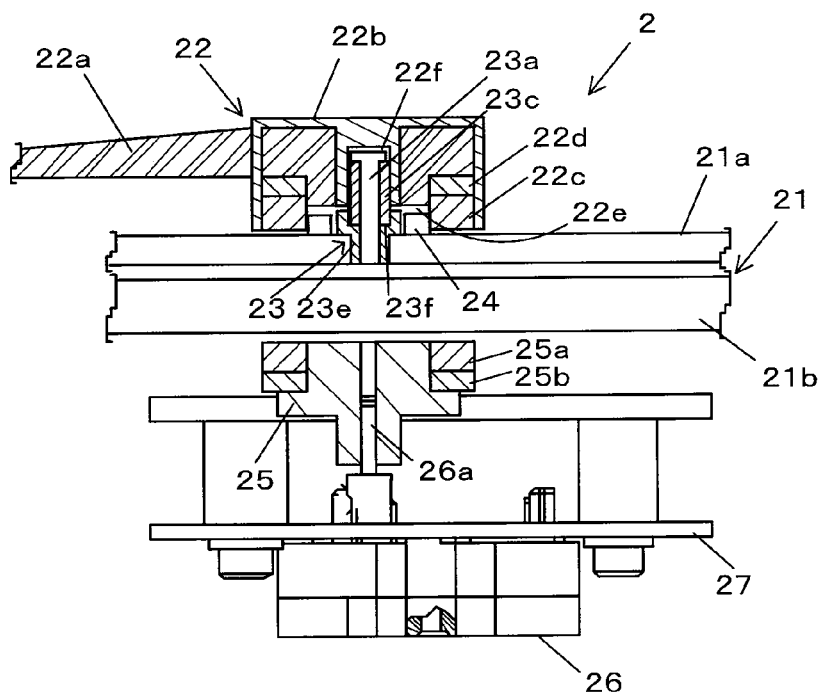
[FIG. 3] An enlarged section view of main portions to show a second embodiment of the present invention.

FIG. 2 is an enlarged section view showing main portions. The speed meter 2 has the display plate 21, the pointer 22, a shaft portion 23, an LED 24, a bearing portion 25, and the stepping motor 26. Reference numeral 27 shows a circuit substrate on which the stepping motor 26 is mounted.

The display plate 21 is formed of a light-transmitting substrate 21a and a liquid crystal display element (variable display element) 21b.

The light-transmitting substrate 21a is made of light-transmitting resin (for example, acrylic or polycarbonate), on which the shaft portion, later described, for rotatably holding the pointer 22 is located.

The liquid crystal display element 21b is provided by sealing-in liquid crystal between a pair of light-transmitting substrates having a transparent electrode film formed thereon to provide a liquid crystal cell and then bonding a polarizing plate onto both surfaces of the liquid crystal cell. For example, a liquid crystal display element of dot-matrix type is used. The liquid crystal display element 21b can display variable contents and can display at least an indicating portion 2a and a character portion 2b.

The pointer 22 has a pointer body 22a, a pointer cap 22b, a first magnet 22c, and a first yoke 22d. The pointer 22 points at the indicating portion 2a displayed by the liquid crystal display element 22a.

The pointer body 22a is made of light-transmitting resin such as polycarbonate, and the pointer cap 22b is fitted at a rotation center portion thereof. The rotation center portion of the pointer body 22a has a hollow portion formed therein for inserting the first magnet 22c and the first yoke 22d. The pointer body 22a also has a light-receive portion 22e for receiving illumination light from the LED 24 placed on the light-transmitting substrate 21a to illuminate the pointer body 22a. The light-receive portion 22e is formed to be positioned in a void portion of the ring-shaped first magnet 22c and first yoke 22d.

The pointer cap 22b is provided by forming non-light-transmitting resin, for example ABS resin, into a substantially tubular shape. The pointer cap 22b holds the first magnet 22c and the first yoke 22d pressed therein. In a central portion of the pointer cap 22b, an insertion portion 22f is provided for inserting the shaft portion 23 which rotatably supports the pointer 22.

The first magnet 22c is formed in a ring shape and includes a plurality of S poles and N poles alternately magnetized. The first magnet 22c and a second magnet 25a, later described, attract each other.

The first yoke 22d is provided on a surface of the first magnet 22c that is not facing the second magnet 25a (the non-opposite surface). The first yoke 22d constitutes a magnet circuit which suppresses leakage flux from the non-opposite surface of the first magnet 22c to improve the magnet efficiency.

The shaft portion 23 has a main shaft 23a, a main-shaft receive portion 23b, a rotation shaft portion 23c, and a washer (rotation adjusting member) 23d and rotatably supports the pointer 22. The main shaft 23a is a member of a substantially cylindrical shape which is inserted into a hole portion formed in the main-shaft receive portion 23b and the rotation shaft portion 23c to serve as the rotation center of the pointer 22. The main-shaft receive portion 23b is located in a hollow portion formed in the light-transmitting substrate 21a to secure the main shaft 23a to the light-transmitting substrate 21a. The rotation shaft portion 23c is provided rotatably about the main shaft 23a and is inserted into the insertion portion 22f of the pointer cap 22b together with the main shaft 23a to be pressed and held in the pointer cap 22b. The washer 23d is a member of a substantially ring shape located between the rotation shaft portion 23c and the main-shaft receive portion 23b and produces a proper frictional force of the rotation shaft portion 23c by adjusting the frictional force of the rotation shaft portion 23c, thereby suppressing an overshoot and pulsation in association with the rotation of the pointer 22 (damping effect). Each of the members 23a to 23d which constitute the shaft portion 23 is made of a non-magnetic material such as aluminum and brass, for example.

The bearing portion 25 has the second magnet 25a and a second yoke 25b and is fitted to a rotation shaft 26a of the stepping motor 26. The pointer drive means in the embodiment is formed of the bearing portion 25 and the stepping motor 26.

The second magnet 25a is placed at the position opposite to the first magnet 22c with the display plate 21 interposed between them to form a pair with the first magnet 22c. The second magnet 25a includes a plurality of S poles and N poles alternately magnetized similarly to the first magnet. The second magnet 25a may be provided in a method in which the bearing portion 25 is formed with plastic magnet and the portion thereof opposite to the first magnet 22c is magnetized, or in a method in which the second magnet 25a is formed with a different member from the bearing portion 25 and then insert molding or outsert molding is performed for integral formation.

The second yoke 25b is provided closer to a surface of the second magnet 25a that is not opposite to the first magnet 22c (the non-opposite surface). The second yoke 25b constitutes a magnet circuit which suppresses leakage flux from the non-opposite surface of the second magnet 25a to improve the magnet efficiency.

The first embodiment is characterized in that the shaft portion 23 for rotatably supporting the pointer 22 is located in the display plate 21 and the shaft portion 23 includes the main shaft 23a, the main-shaft receive portion 23b which secures the main shaft 23a to the display plate 21, and the rotation shaft portion 23c which is provided rotatably about the main shaft 23a and is located on and secured to the pointer 22. Thus, the rotation shaft portion 23c located between the main shaft 23a and the pointer cap 22b can increase the frictional force which secures the pointer 22 to the shaft portion 23, thereby enhancing the fixing of the pointer 22.

In addition, the non-magnetic material forming each of the members 23a to 23d of the shaft portion 23 can prevent the members 23a to 23d constituting the shaft portion 23 from affecting the magnetic force of the first and second magnets 22c, 25a. This can suppress occurrence of pointer fluctuations or erroneous pointing in the pointing operation of the pointer 22.

The washer 23d located between the rotation shaft portion 23c and the main-shaft receive portion 23d in the shaft portion 23 can adjust the frictional force of the rotation shaft portion 23c to the proper level for securing the pointer 22. It is thus possible to provide a more appropriate structure for securing the pointer 22.

The light-transmitting substrate 21a is included in the display plate 21, and the shaft portion 23 for rotatably supporting the pointer 22 is located in the light-transmitting substrate 21a. This eliminates the need to perform processing for supporting the pointer 22 on the liquid crystal display element 21b, so that the pointer 22 can be located easily and the liquid crystal display element 21b can be fabricated more inexpensively.

Next, a second embodiment of the present invention will be described. The components identical or corresponding to those in the abovementioned first embodiment are designated with the same reference numerals and detailed description thereof is omitted.

The second embodiment differs from the first embodiment in the structure of the shaft portion 23 for rotatably supporting the pointer 22.

In the shaft portion 23, a main-shaft receive portion 23e has, at the top end, a hollow portion 23f which contains viscous damper oil (liquid form, not shown), and the bottom end of the rotation shaft portion 23c is located in the hollow portion 23f, as a method of adjusting the frictional force of the rotation shaft portion 23c instead of the washer 23d. The main-shaft receive portion 23e is made of the non-magnetic material as described above. With the structure, in the second embodiment, since the rotation shaft portion 23c is immersed in the damper oil, the viscosity of the damper oil can suppress an overshoot and pulsation in association with the rotation of the pointer 22 (damping effect) to provide a more appropriate structure for fixing the pointer 22.

While the first and second magnets 22c, 25a are permanent magnets in the first and second embodiments, the second magnet 25a may be an electromagnet, for example. An organic EL element may be used as the variable display element in addition to the liquid crystal display element 21b, and a segment type may be used in addition to the dot-matrix type. The display plate may have a fixed display element in which a light-shield portion is formed through printing on light-transmitting resin to form a fixed display portion at which the pointer 22 points, for example. The illumination means for illuminating the pointer 22 is not limited to the LED 26. For example, an organic EL element is used for the display plate 21 and the light from the organic EL element is directed toward the light-receive portion 22e. While the stepping motor 26 is included as the pointer drive means, and a cross-coil movement may be used, for example, instead of the stepping motor 26.

Industrial Applicability

The present invention is preferable for an indicator apparatus in which a pointer is secured to a pointer drive means by the attraction force of magnets.

The invention claimed is:

1. An indicator apparatus, comprising:
a display plate;
a pointer provided on a front-face side of the display plate;
a pointer drive means provided on a back-face side of the display plate for rotating the pointer;
a first magnet provided, at the front-face side, for the pointer; and
a second magnet provided, at the back-face side, for the pointer drive means to be opposite to the first magnet, the pointer being rotated in association with rotation drive of the pointer drive means by attraction force of the first and second magnets, wherein:
a shaft portion rotatably supporting the pointer is located in the display plate,
the shaft portion includes a main shaft, a main-shaft receive portion securing the main shaft to the display plate, and a rotation shaft portion provided rotatably about the main shaft and located on and secured to the pointer, and
the main-shaft receive portion has a hollow portion containing a viscous liquid and the bottom end of the rotation shaft portion is located in the hollow portion.

2. The indicator apparatus according to claim 1, wherein the shaft portion is made of a non-magnetic material.

3. The indicator apparatus according to claim 1, wherein the display plate has a variable display element including a variable display portion at which the pointer points.

4. The indicator apparatus according to claim 1, wherein the display plate has a light-transmitting substrate in which the shaft portion is located.

* * * * *